(12) United States Patent
Stroup et al.

(10) Patent No.: US 11,007,904 B1
(45) Date of Patent: May 18, 2021

(54) SEAT ADJUSTMENT DEVICE

(71) Applicant: RGT, LLC, Lewisport, KY (US)

(72) Inventors: Randy Stroup, Lewisport, KY (US); Greg Boarman, Reynolds Station, KY (US); Travis Higdon, Reynolds Station, KY (US)

(73) Assignee: RGT, LLC, Lewisport, KY (US)

( * ) Notice: Subject to any disclaimer, the term of this patent is extended or adjusted under 35 U.S.C. 154(b) by 0 days.

(21) Appl. No.: 17/076,101

(22) Filed: Oct. 21, 2020

Related U.S. Application Data

(60) Provisional application No. 62/923,643, filed on Oct. 21, 2019.

(51) Int. Cl.
*B60N 2/08* (2006.01)
*B60N 2/07* (2006.01)

(52) U.S. Cl.
CPC ......... *B60N 2/0818* (2013.01); *B60N 2/0705* (2013.01)

(58) Field of Classification Search
CPC ............................ B60N 2/0818; B60N 2/0705
USPC ................... 248/429, 424; 296/65.13, 65.14
See application file for complete search history.

(56) References Cited

U.S. PATENT DOCUMENTS

| | | | | |
|---|---|---|---|---|
| 3,866,876 A * | 2/1975 | Adams | ................ | B60N 2/0705 248/429 |
| 4,601,455 A * | 7/1986 | Lowe | .................... | B60N 2/123 248/429 |
| 5,732,923 A * | 3/1998 | Tame | ................... | B60N 2/0705 248/430 |
| 8,695,937 B2 * | 4/2014 | Yamada | ............... | B60N 2/0875 248/429 |
| 2013/0206952 A1 * | 8/2013 | Yamada | ............... | B60N 2/0722 248/429 |
| 2018/0334054 A1 * | 11/2018 | Higuchi | ................ | B60N 2/067 |
| 2020/0108737 A1 * | 4/2020 | Runde | ................. | B60N 2/0707 |

\* cited by examiner

*Primary Examiner* — Muhammad Ijaz
(74) *Attorney, Agent, or Firm* — Wyatt, Tarrant & Combs, LLP; Max E. Bridges; Matthew A. Williams

(57) ABSTRACT

A seat adjustment device for a vehicle comprising a base member, a pair of lower rails, a pair of upper rails, a pair of latch assemblies, a handle, and a top member, wherein the adjustment device is adjustable within a range toward the front of the vehicle or the rear of the vehicle.

10 Claims, 16 Drawing Sheets

SEAT ADJUSTMENT DEVICE

CROSS-REFERENCE TO RELATED APPLICATIONS

This patent application claims the benefit of and priority to U.S. Provisional Patent Application Ser. No. 62/923,643, with a filing date of Oct. 21, 2019, the contents of which are fully incorporated herein by reference.

FIELD OF INVENTION

The embodiments described herein relate to seat adjustment devices for various types of trucks such as semi-trailer trucks, long box trucks, and other vehicles. The seat adjustment devices of the present embodiments can be easily adjusted for each individual driver without removing the entire seat and provide greater flexibility.

BACKGROUND

In conventional trucks, the driver's seat is typically bolted directly to the floor and/or cannot be adjusted to accommodate a range of drivers. This presents a significant problem because the conventional truck driver's seat cannot accommodate drivers of different sizes, heights, and weights. Instead, if a driver is swapped for a particular truck, the entire driver's seat and base apparatus must be removed and a new seat and base apparatus installed to fit the new driver. This is a significant issue for the trucking industry, especially for those who frequently switch drivers. Moreover, this has been an unsolved-problem for many years.

Accordingly, there is a significant and long-felt need for a seat-adjustment device that can be easily adjusted for each driver without removing the entire seat. Such an improvement would offer a "one-size-fits-all" device that could easily adjust for each driver. Along with other features and advantages outlined herein, seat adjustment devices within present embodiments meet these and other needs. In doing so, the inventive apparatuses easily adjust for each driver and offer additional room as compared to conventional seats.

SUMMARY OF EMBODIMENTS

A seat adjustment device, according to multiple embodiments and alternatives, provides greater adjustment flexibility and more room for truck drivers to sit. As compared to conventional seats, the seat adjustment device according to multiple embodiments and alternatives offers at least an additional six inches of room. Moreover, the seat adjustment device is adapted to be secured to the floor of the cab of a truck and is sized to receive the standard driver's seat.

Structurally, the present embodiments of the seat adjustment device comprise a base member, a pair of lower rails, a pair of upper rails, a pair of latch assemblies, a handle, and a top member. According to multiple embodiments and alternatives, the base member is adapted to be secured to the floor of the cab. The pair of lower rails are securely attached to the base member, have a plurality of gears, and are adapted to receive the pair of upper rails. The handle is pivotally attached to the pair of latch assemblies, which in turn engage the lower and upper rails. The pair of upper rails are then securely attached to the top member which is adapted to receive the driver's seat.

To move the seat adjustment device, a user pulls upward on the handle. This upward movement causes teeth in the pair of latch assemblies to disengage from the pair of lower rails thereby permitting the user to move the pair of upper rails forward or backward. Once the seat is moved to the desired location, the user releases the handle and teeth in the pair of latch assemblies reengage with the pair of lower rails thereby returning the seat adjustment device to the latched position. According to multiple embodiments and alternatives, the pair of latch assemblies also comprise a pair of rods that bias the seat adjustment device towards the latched position to prevent the seat from moving during operation.

BRIEF DESCRIPTION OF THE FIGURES

The drawings and embodiments described herein are illustrative of multiple alternative structures, aspects, and features of the present embodiments, and they are not to be understood as limiting the scope of present embodiments. It will be further understood that the drawing figures described and provided herein are not to scale, and that the embodiments are not limited to the precise arrangements and instrumentalities shown.

MULTIPLE EMBODIMENTS AND ALTERNATIVES

Figure 1:
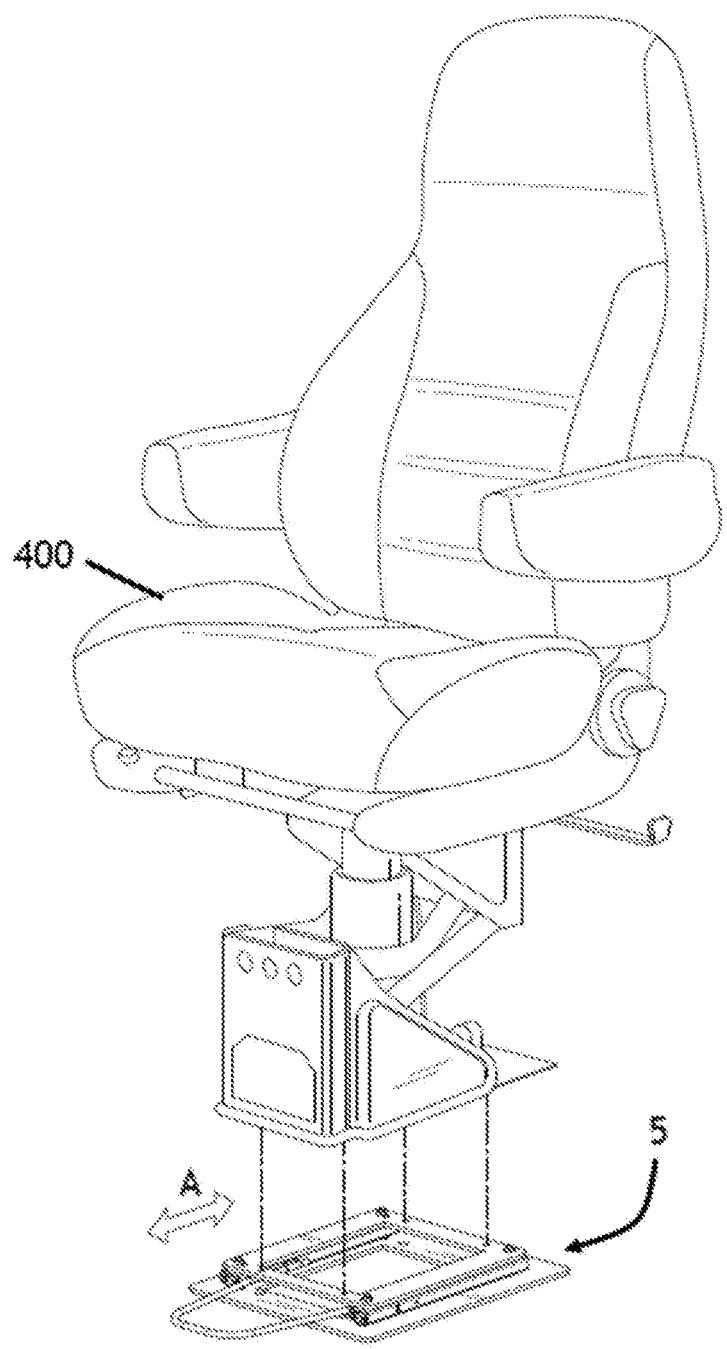
FIG. 1 is a perspective view of a seat adjustment device receiving a standard truck driver's seat, according to multiple embodiments and alternatives.

FIG. 1 shows a vehicle seat and base apparatus 400. Traditionally, standard seat and base apparatus 400 bolts directly into the floor of the cab of a vehicle and the seat portion of the base apparatus 400 is adjustable within a fixed range toward the front of the vehicle or the rear vehicle (also referred to as a first, fixed range herein). As noted above, this traditional approach presents a significant problem because the first, fixed range of conventional vehicle seat and base apparatus 400 is not sufficient to adjust for drivers of different sizes, heights, and weights. Instead, if a driver is swapped for a particular vehicle, the entire seat and base apparatus 400 must be removed and a new seat installed to fit the new driver. However, as shown in FIG. 1, seat adjustment device 5 (also referred to as an adjustment mechanism herein) addresses this problem by being adapted to attach directly to the floor of the cab of a truck, by being adapted to receive standard base seat and base apparatus 400, and by permitting the seat and base apparatus 400 to be adjusted within a second, fixed range without removing the entire apparatus from the truck. According to multiple embodiments and alternatives, seat adjustment device 5 allows the seat and base apparatus 400 to be adjusted forward or backward along the arrow A within the second, fixed range (shown in FIG. 1).

Figure 2:
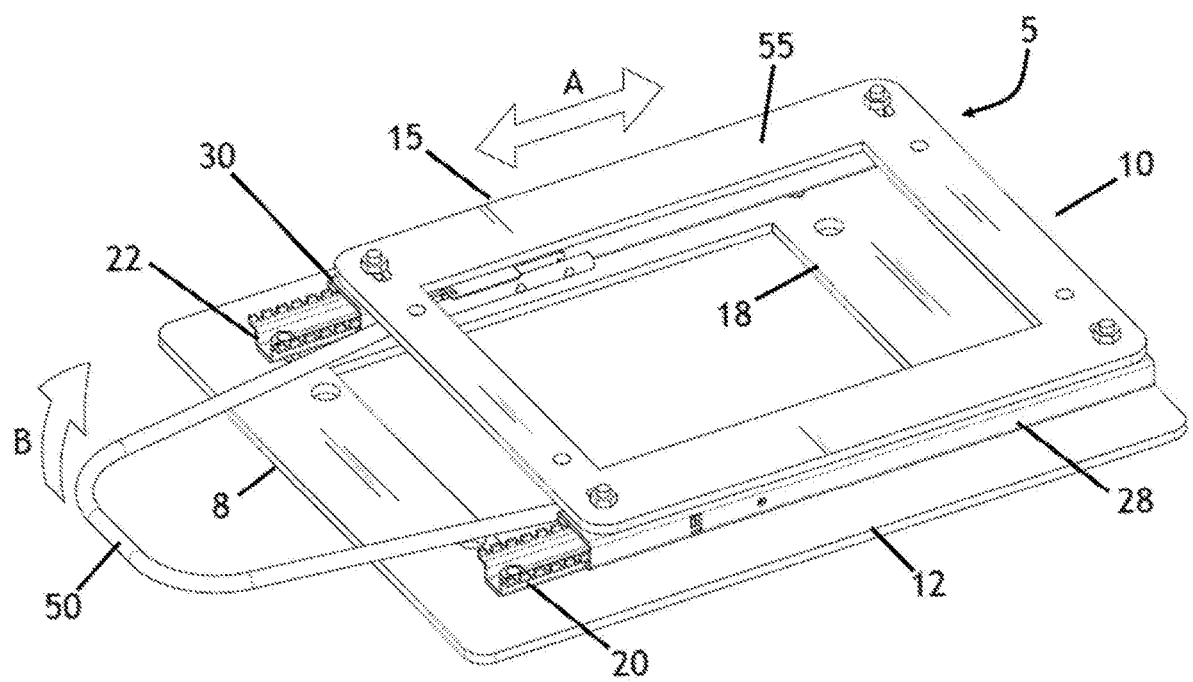
FIG. 2 is a perspective view of a seat adjustment device, according to multiple embodiments and alternatives.
Figure 3:
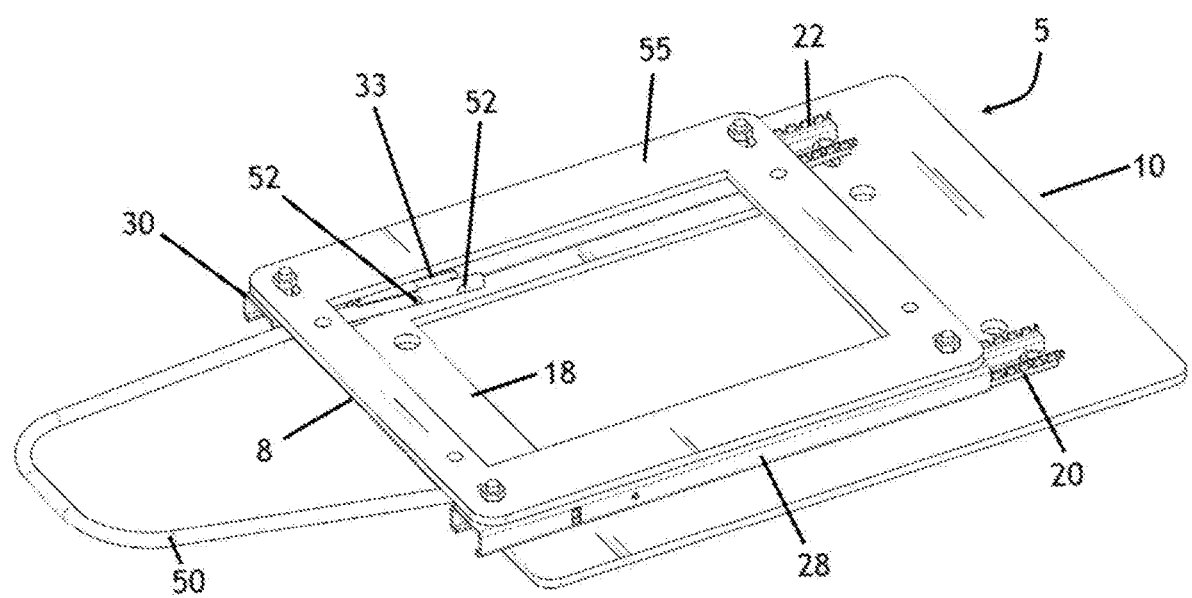
FIG. 3 is a perspective view of a seat adjustment device, according to multiple embodiments and alternatives.
Figure 4:
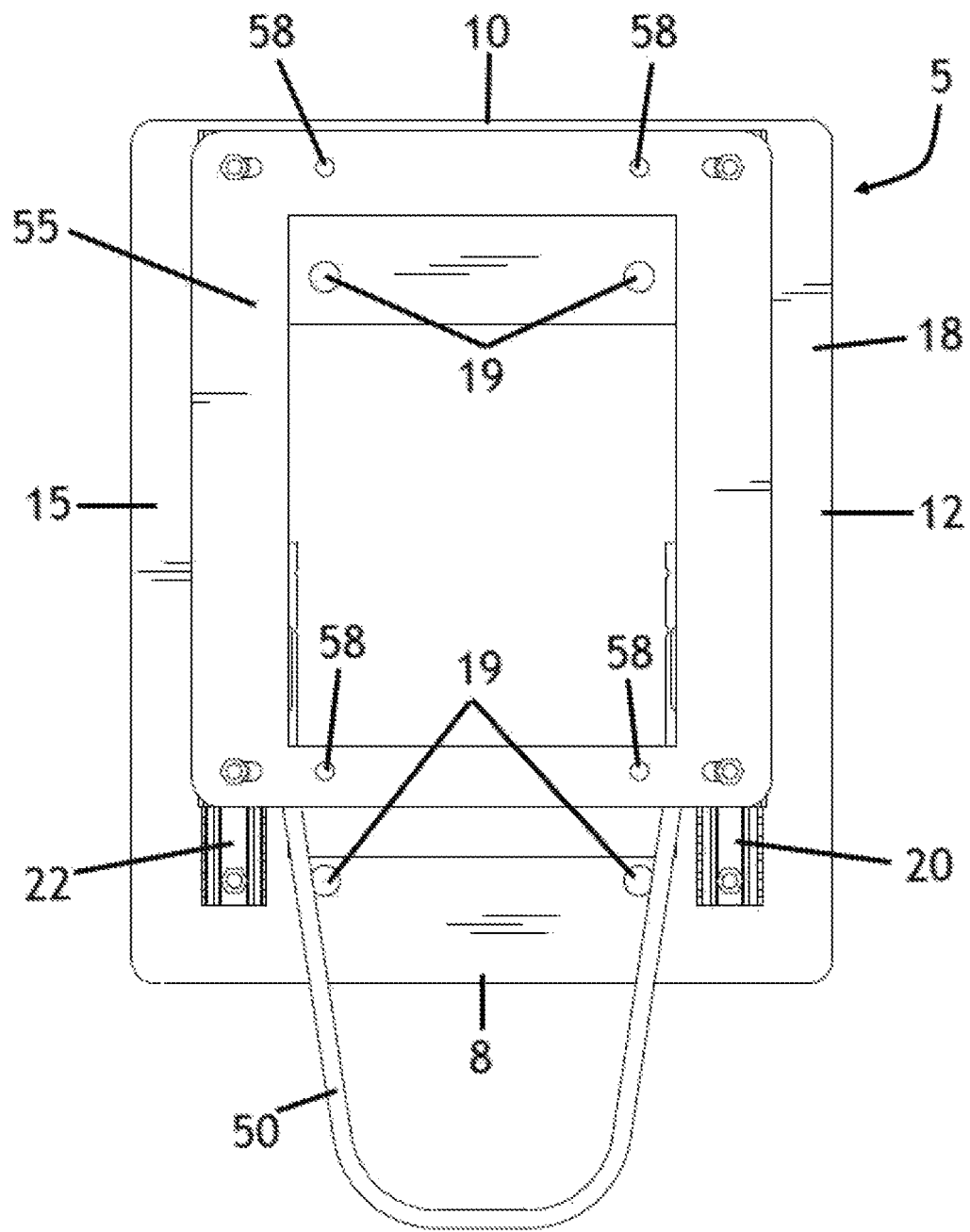
FIG. 4 is a plan view of a seat adjustment device, according to multiple embodiments and alternatives.

As shown in FIGS. 2, 3, and 4, seat adjustment device 5 comprises base member 18, a first lower rail 20, a second lower rail 22, a first upper rail 28, a second upper rail 30, a handle 50, and top member 55. The seat adjustment device 5 further comprises a front 8, a back 10, a first side 12, and a second side 15. When placed in a vehicle, the front 8 of seat adjustment device 5 must be oriented towards the front of the vehicle such that a user can readily access handle 50 while sitting in seat and base apparatus 400, as illustrated in FIG. 1.

Figure 5A:
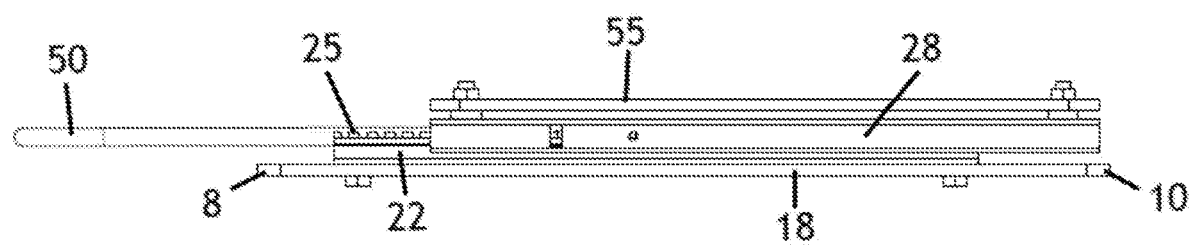
FIG. 5A is a side view of a seat adjustment device in a latched position, according to multiple embodiments and alternatives.
Figure 5B:
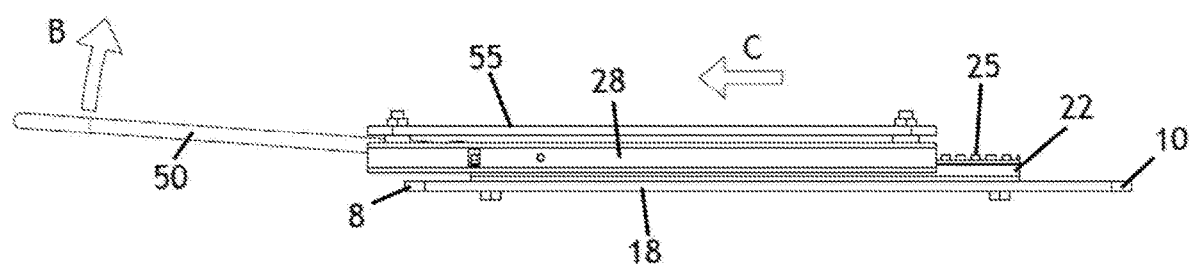
FIG. 5B is a side view of a seat adjustment device in a released position, according to multiple embodiments and alternatives.

FIGS. 2-5B illustrate the plurality of gears 25 which run along the top length of both the first lower rail 20 and the second lower rail 22. As shown in FIG. 2, the pair of upper rails 28, 30, handle 50, and the top member 55 can move forward or backward along arrow A (as one unit) by lifting handle 50 upwards along arrow B. As discussed in further detail below, the upward movement of handle 50 causes the pair of teeth 35 of the latch assemblies 32, 33 to move from the latched positioned (best illustrated in FIGS. 6A and 7A) to the released position (best illustrated in FIGS. 6B and 7B), thereby permitting the user to move the pair of upper rails 28, 30 and top member 55 along the pair of lower rails 20, 22 in either direction along arrow A. In FIGS. 2 and 5A, the pair of upper rails 28, 30 and top member 55 are positioned towards the back 10 of seat adjustment device 5. As shown in FIGS. 3 and 5B, the pair of upper rails 28, 30 and top member 55 can also be positioned towards the front 8 of seat adjustment device 5. In some embodiments, seat adjustment device 5 provides the user at least six inches of room within the second fixed range (i.e. between the front and back positions illustrated in these figures).

FIG. 4 illustrates the plurality of bolt receiving holes 19 formed in base member 18. According to multiple embodiments and alternatives, the plurality of bolt receiving holes 19 are adapted to permit base member 18 to attach securely directly to the floor of the cab of a vehicle via nuts 80, bolts 82, and washers 85. In FIG. 4, top member 55 has a plurality of bolt receiving holes 58 which are adapted to receive seat and base apparatus 400 via nuts 80, bolts 82, and washers 85. According to multiple embodiments and alternatives, the components of seat adjustment device 5 are also secured together by nuts 80, bolts 82, and washers 85. However, any suitable method may be utilized to secure the components together as known to those of ordinary skill in the art.

In FIG. 5A, the pair of upper rails 28, 30 and top member 55 are positioned towards the back 10 of seat adjustment device. From FIG. 5A to FIG. 5B, the pair of upper rails 28, 30 and top member 55 moved forward along arrow C towards the front 8 of seat adjustment device. To move the pair of upper rails 28, 30 and top member 55 along the pair of lower rails 20, 22, the user must pull handle 50 upwards along arrow B to move the pair of latch assemblies 32, 33 from the latched positioned to the released position.

Figure 8:
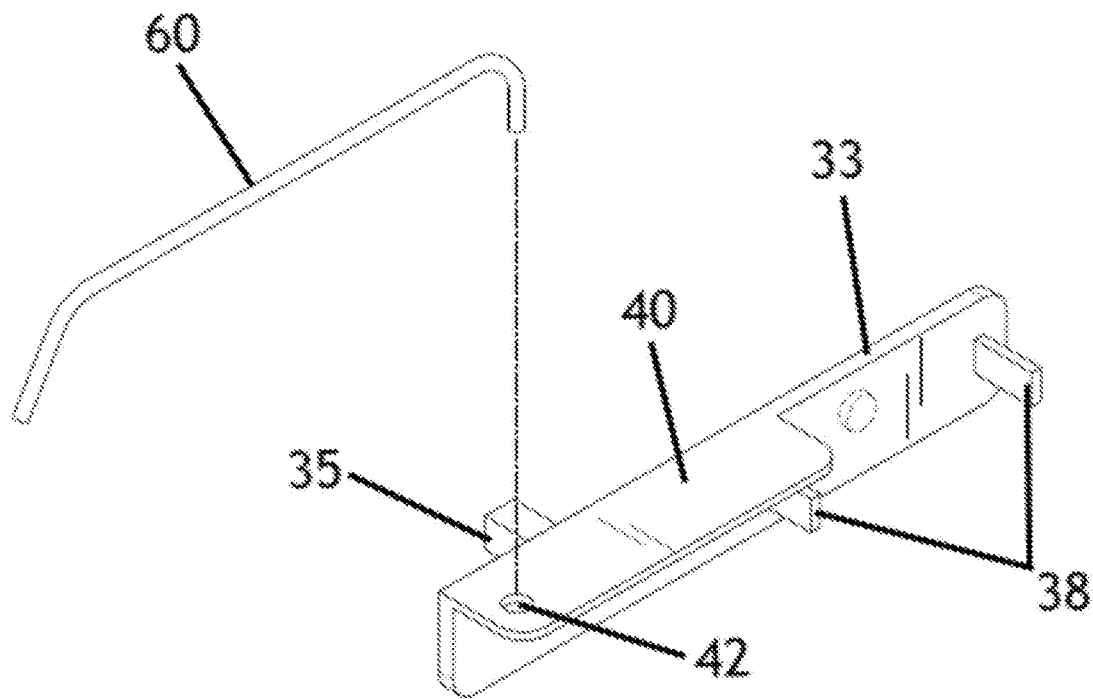
FIG. 8 is a perspective view of a rod and a latch assembly, according to multiple embodiments and alternatives.
Figure 9:
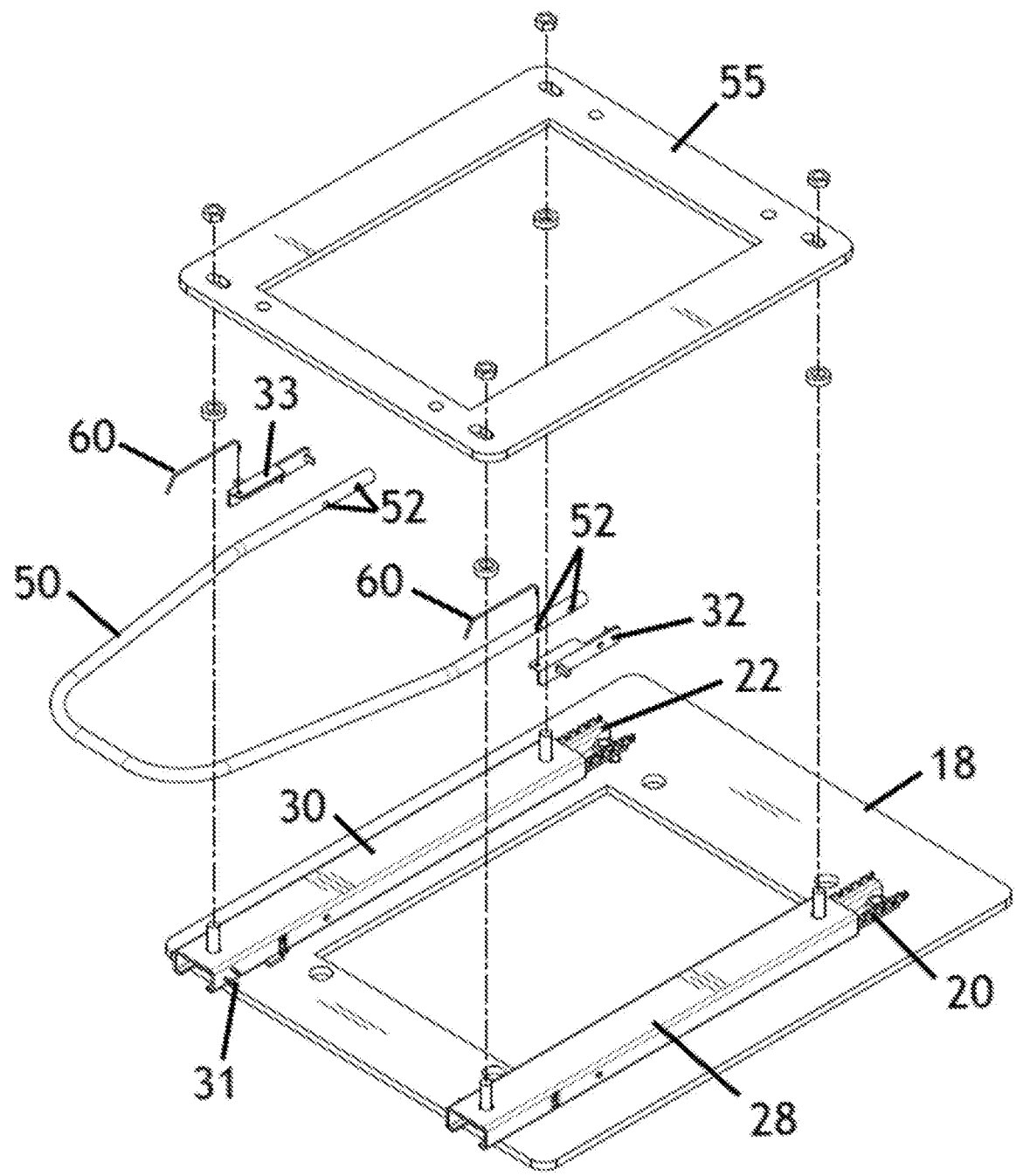
FIG. 9 is an exploded view of a seat adjustment device, according to multiple embodiments and alternatives.

As shown in FIG. 8, the second latch assembly 33 comprises a pair of spurs 38, a shelf 40, a tooth 35, and a rod receiving hole 42. The first latch assembly 32 has identical components as the second latch assembly 33, but is a mirror image of the second latch assembly 33 in order to receive the handle 50 (as best shown in FIG. 9). FIGS. 3 and 9 illustrate the spur receiving holes 52 in handle 50 which are adapted to pivotally attach to the pair of spurs 38 of the latch assemblies 32, 33. When handle 50 is pulled upwards, handle 50 rotates about the pair of spurs 38 of the latch assemblies 32, 33, engages and applies an upward force to shelf 40 and spurs 38, thereby moving tooth 35 of the latch assemblies to the released position.

As best shown in FIG. 9, each of the upper rails have a pair of rod hooks 31, located towards the front 8 of seat adjustment device 5, which are adapted to receive the rods 60. When seat adjustment device 5 is assembled, the pair of rods 60 are connected to both the rod hooks 31 and are received in the rod receiving holes 42 of the latch assemblies 32, 33. The pair of rods 60 apply a downward force to bias the seat adjustment 5 towards the latched position to prevent the seat and base apparatus 400 from moving during operation.

Figure 6A:
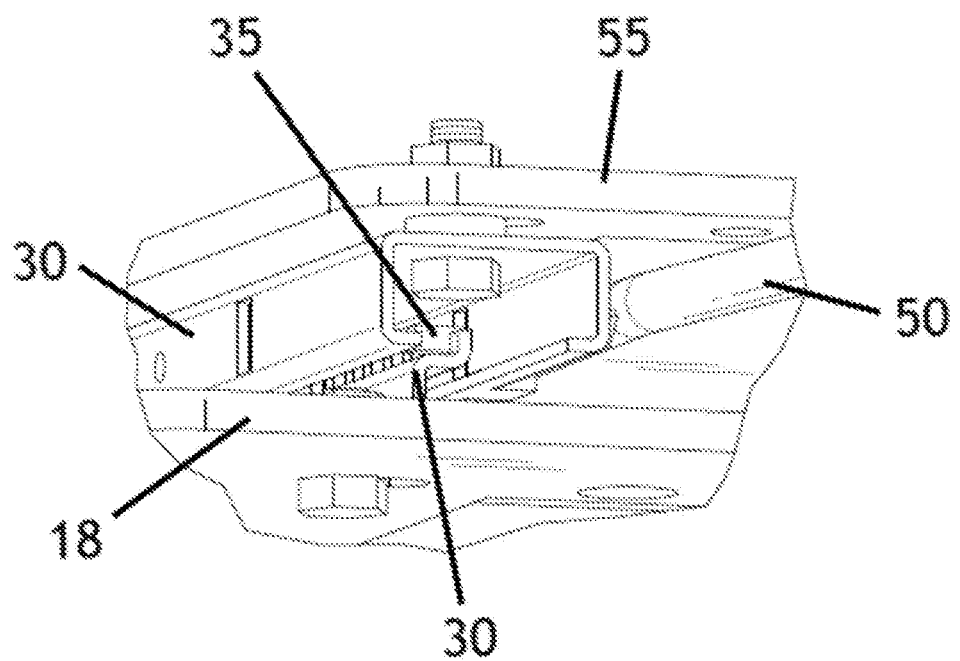
FIG. 6A is a close-up view of the tooth of a latch assembly in a latched position, according to multiple embodiments and alternatives.
Figure 6B:
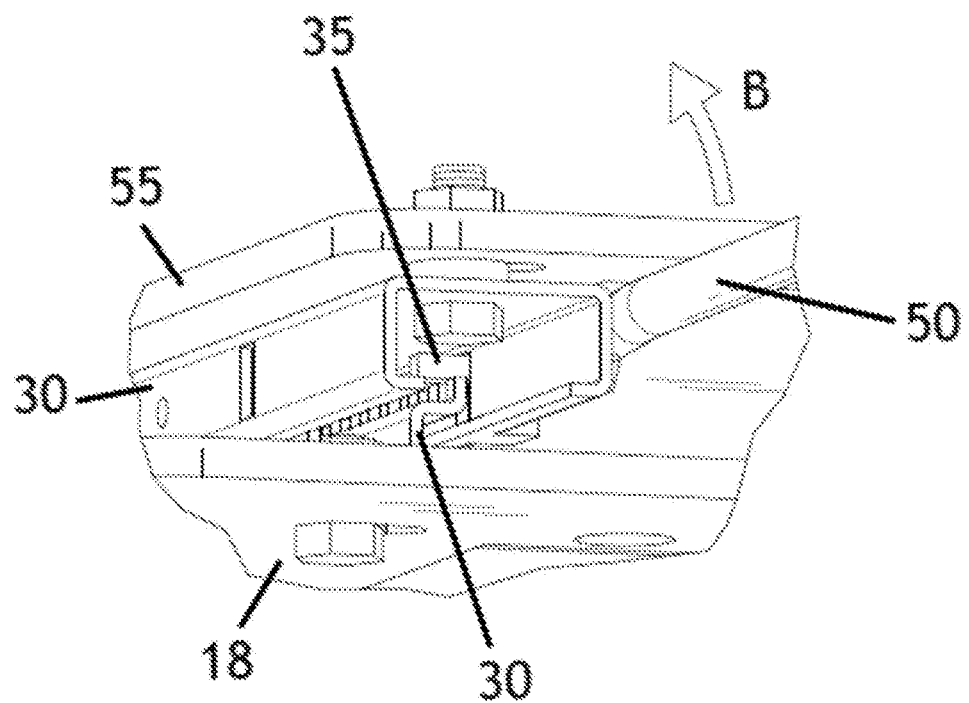
FIG. 6B is a close-up view of the tooth of a latch assembly in a released position, according to multiple embodiments and alternatives.
Figure 7A:
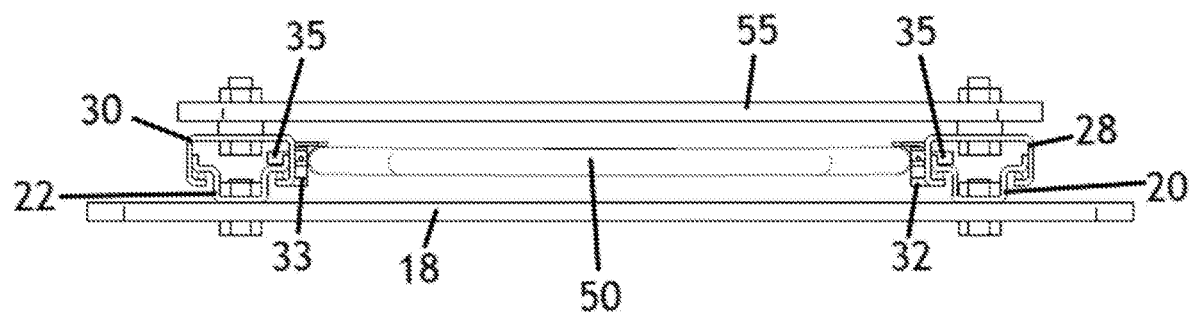
FIG. 7A is a front view of a seat adjustment device in a latched position, according to multiple embodiments and alternatives.
Figure 7B:
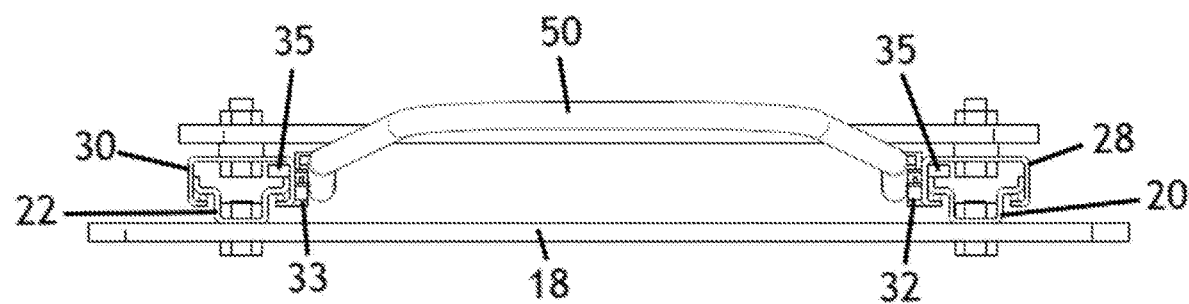
FIG. 7B is a front view of a seat adjustment device in a released position, according to multiple embodiments and alternatives.

FIGS. 6A and 7A illustrate the seat adjustment device 5 in the latched position and FIGS. 6B and 7B illustrate the released position. When in the latched position, the teeth 35 of the pair of latch assemblies 32, 33 engage both the upper rails 28, 30 and the plurality of gears 25 of the lower rails 20, 22, thereby preventing movement of the seat adjustment device. When the user pulls the handle 50 upwards along arrow B and overcomes the biasing force applied by the pair of rods 60, the teeth 35 of the pair of latch assemblies 32, 33 move above the plurality of gears 25 (as shown in FIGS. 6B and 7B). Once in this released position, the user can move the seat adjustment device 5 forward or backward along the lower rails 20, 22 as desired. Once moved to the desired location, the user simply releases handle 50 and the biasing force of the pair of rods 60 causes the teeth 35 of the pair of latch assemblies 32, 33 to reengage the plurality of gears 25 of the lower rails 20, 22, thereby returning the seat adjustment device 5 to the latched position.

Referring now to FIG. 9, an exemplary embodiment of seat adjustment device 5 includes base member 18, which includes a plurality of bolt receiving holes 19 that are adapted to securely attach to the floor of the cab of a truck. A first lower rail 20 is rigidly attached to the first side of the base member 18 and a second lower rail 22 is rigidly attached to the second side of the base member 18. When the pair of rails 28, 30, are secured to base member 18, they are parallel to one another, according to multiple embodiments and alternatives. A plurality of gears 25 run along the top length of both the first lower rail 20 and the second lower rail 22.

As best shown in FIGS. 7A and 7B, the first upper rail 28 is placed about the first lower rail 20 and the second upper rail 30 is placed about the second lower rail 22. The tooth 35 of the first latch assembly 32 then engages the first upper rail 28 and the plurality of gears 25 of the first lower rail 20. Likewise, the tooth 35 of the second latch assembly 33 engages the second upper rail 30 and the plurality of gears 25 of the second lower rail 22. The pair of rods 60 are then attached to the rod receiving holes 42 formed in the pair of latch assemblies 32, 33 and the rod hooks 31 formed on both the pair of upper rails 28, 30.

Next, the spurs 38 on the pair of latch assemblies 32, 33 receive the spur receiving holes 52 of handle 50. Top member 55 is then securely attached to the pair of upper rails 28, 30 with the handle 50 situated between the base member 18 and the top member 55. In the exemplary embodiment illustrated in FIG. 9, the components are secured together with nuts 80, bolts 82, and washers 85. Moreover, in some embodiments the components of the seat adjustment device 5 are formed from metal, steel, or any suitable material. Once assembled, the top member 55, the handle 50, and the pair of upper rails 28, 30 can travel as a single unit along the pair of lower rails 20, 22 (via arrow A as shown in FIG. 2) once the seat adjustment device 5 is from moved the latched position to the released position.

Figure 10B:
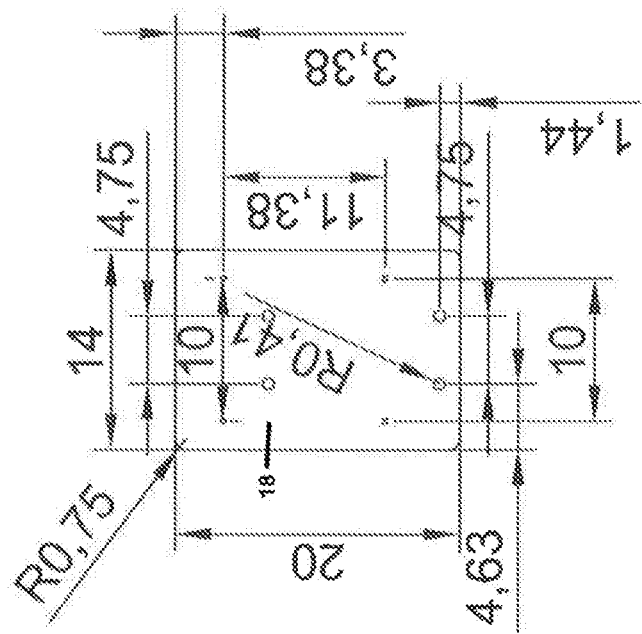
FIG. 10B is a plan view of an exemplary base member, with various distances and measurements shown, according to multiple embodiments and alternatives.
Figure 10A:
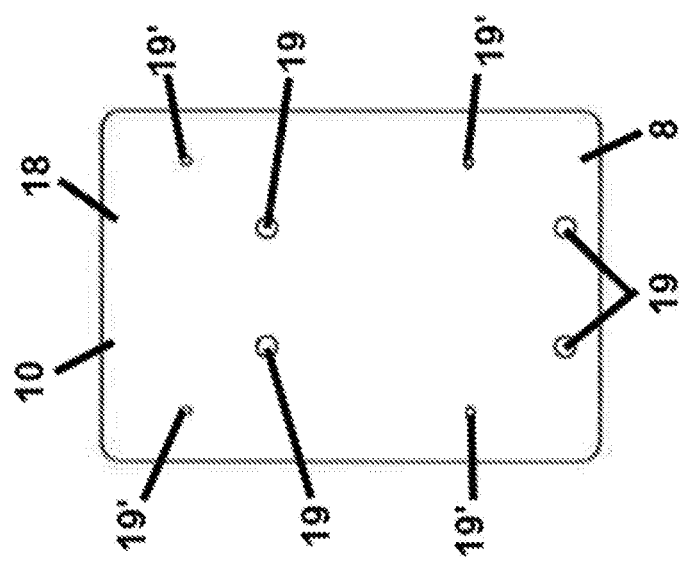
FIG. 10A is a plan view of a base member of a seat adjustment device, according to multiple embodiments and alternatives.

FIG. 10A shows a plan view of base member 18, which consists of a back region 10, a front region 8, and a series of bolt receiving holes 19, 19'. FIG. 10B illustrates the various measurements, the length, the width, and the dimensions of an exemplary embodiment of a base member 18. FIG. 10B also shows the distances between the bolt receiving holes 19, 19' and the distances of the bolt receiving holes 19, 19' to the edges of an exemplary embodiment of a base member 18.

Figure 11B:
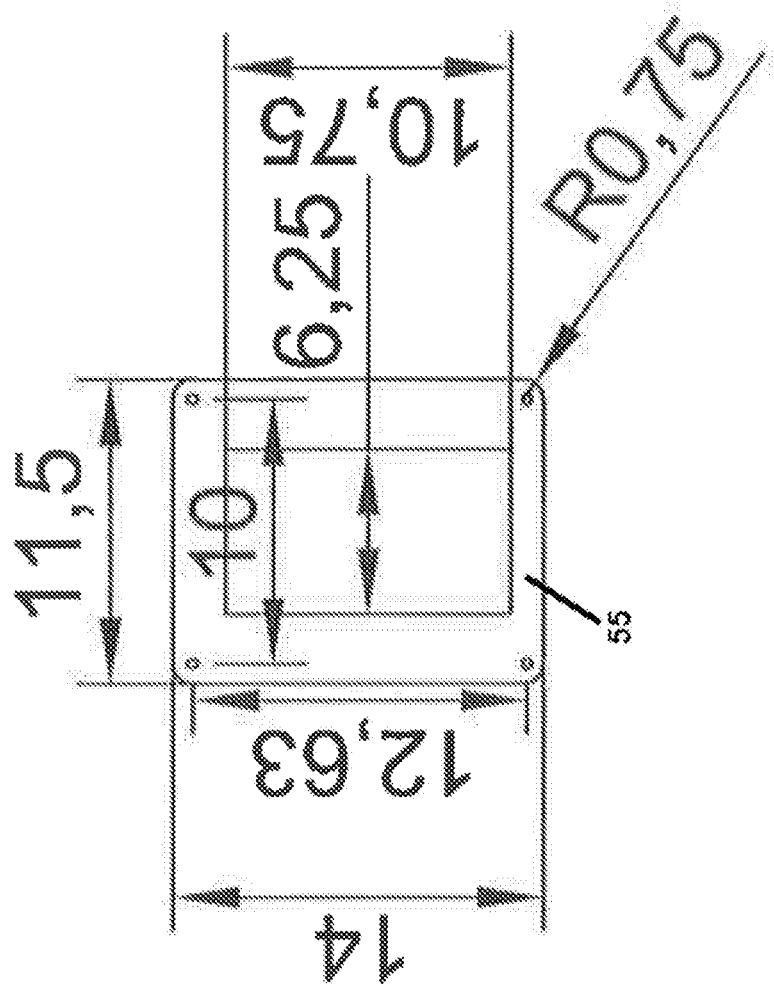
FIG. 11B is a plan view of an exemplary top member, with various distances and measurements shown, according to multiple embodiments and alternatives.
Figure 11A:
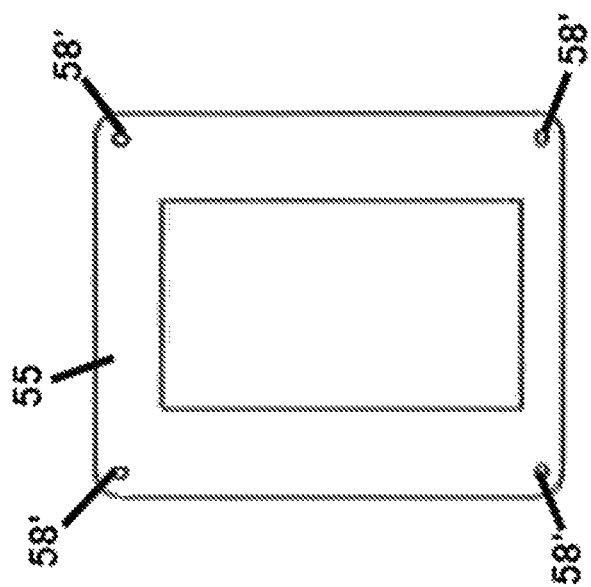
FIG. 11A is a plan view of a top member of a seat adjustment device, according to multiple embodiments and alternatives.

FIG. 11A shows a plan view of top member 55, which consists of a series of bolt receiving holes 58'. FIG. 11B shows the various measurements, the length, the width, and the dimensions of an exemplary embodiment of a top member 55. FIG. 11B also illustrates the distances between the bolt receiving holes 58'.

Figure 12:
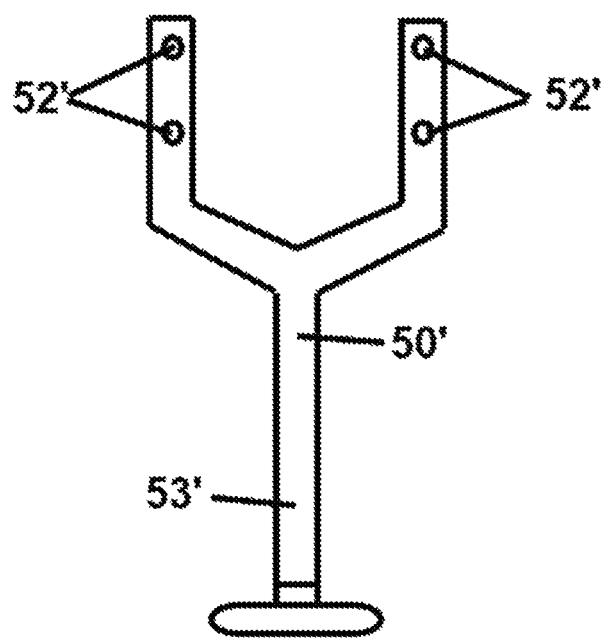
FIG. 12 is a plan view of a handle of a seat adjustment device, according to multiple embodiments and alternatives.
Figure 13:
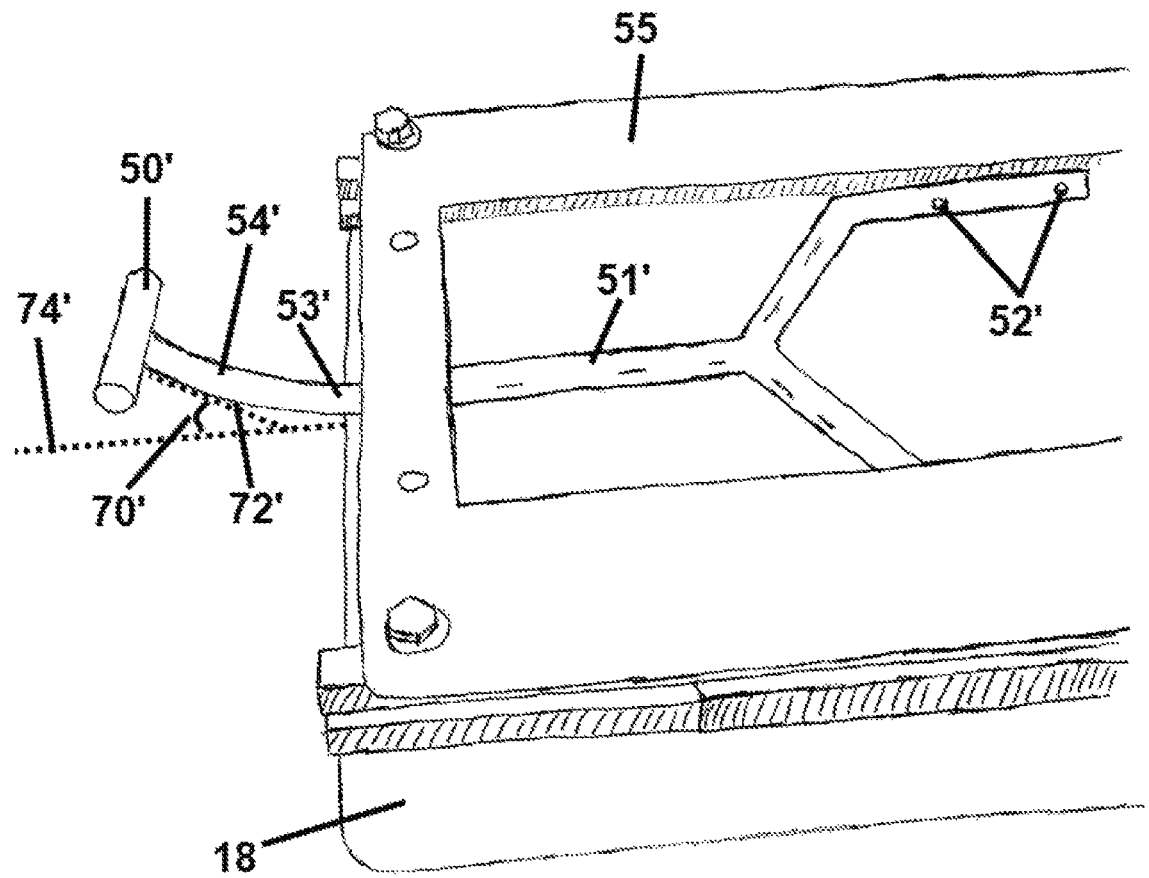
FIG. 13 is a perspective view of the handle shown in FIG. 12 in a seat adjustment device, according to multiple embodiments and alternatives.

FIGS. 12 and 13 illustrate handle 50' which is similar to the shape of a wishbone, according to multiple embodiments and alternatives. Handle 50' consists of a series of spur receiving holes 52', inflection point 53', flat region 51' and angled region 54'. In some embodiments, the handle 50' consists of a ½ inch solid bar and the spur receiving holes 52' are ¼ of an inch in diameter. According to multiple embodiments and alternatives, the flat region 51' is parallel to the ground and then handle 50' angles upward after the inflection point 53' to form angled region 54'. As shown in FIG. 13, angled region 54' defines lateral edge 72' and also defines angle 70' formed by handle latitudinal axis 74'. In some embodiments, the angle 70' is at least 20° degrees. In some embodiments, the angle is 22.5°.

Similar to handle 50 (best illustrated in FIG. 9), handle 50' connects to the seat adjustment device 5 via the spur receiving holes 52'. In some embodiments, the spurs 38 on the pair of latch assemblies 32, 33 receive the spur receiving holes 52' of handle 50'. Top member 55 is then securely attached to the pair of upper rails 28, 30 with the handle 50' situated between the base member 18 and the top member 55, as shown in FIG. 13. Just like handle 50, when the user pulls the handle 50' upwards, the user can move the seat adjustment mechanism from the latched to the unlatched position and adjust the seat as desired.

It will be understood that the embodiments described herein are not limited in their application to the details of the teachings and descriptions set forth, or as illustrated in the accompanying figures. Rather, it will be understood that the present embodiments and alternatives, as described and claimed herein, are capable of being practiced or carried out in various ways.

Also, it is to be understood that words and phrases used herein are for the purpose of description and should not be regarded as limiting. The use herein of "including," "comprising," "e.g.," "containing," or "having" and variations of those words is meant to encompass the items listed thereafter, and equivalents of those, as well as additional items.

Accordingly, the foregoing descriptions of several embodiments and alternatives are meant to illustrate, rather than to serve as limits on the scope of what has been disclosed herein. The descriptions herein are not intended to be exhaustive, nor are they meant to limit the understanding of the embodiments to the precise forms disclosed. It will be understood by those having ordinary skill in the art that modifications and variations of these embodiments are reasonably possible in light of the above teachings and descriptions.

What is claimed is:

1. A seat adjustment device for a vehicle, comprising:
an adjustment mechanism adapted to be affixed to a floor portion of the vehicle, said adjustment mechanism being adjustable within a first range toward a front of the vehicle or a rear of the vehicle, said adjustment mechanism further comprising
a base member;
a pair of lower rails, said pair of lower rails each having a top length comprising a plurality of gears;
a pair of upper rails, said pair of upper rails being slidably mounted to the pair of lower rails;
a pair of latch assemblies, each pair of latch assemblies having a tooth;
a handle, said handle being attached to the pair of latch assemblies; and
a top member;
wherein the tooth of the pair of latch assemblies engage the plurality of gears and the pair of upper rails;
wherein the tooth of the pair of latch assemblies disengage from the plurality of gears as the handle pivots rotationally in an upward direction;
further comprising a pair of rods in contact with the pair of latch assemblies and the pair of upper rails, wherein the pair of rods apply a force that must be overcome for the tooth of the pair of latch assemblies to move from a first position to a second position, wherein the tooth is engaged to the plurality of gears in the first position and wherein the tooth is disengaged from the plurality of gears in the second position;
wherein the pair of latch assemblies each further comprise at least one spur, a shelf, and a rod receiving hole.

2. The seat adjustment device of claim 1, wherein the base member and the top member each define a plurality of bolt receiving holes.

3. The seat adjustment device of claim 1, wherein the handle presses into the shelf as the handle pivots rotationally in the upward direction.

4. The seat adjustment device of claim 3, wherein each of the upper rails further comprise at least one rod hook, wherein each of the pair of rods connect to the rod receiving hole and the at least one rod hook.

5. The seat adjustment device of claim 1, further comprising a seat and base apparatus, said seat thereof being adjustable within a second range toward the front of the vehicle or the rear of the vehicle.

6. A seat adjustment device for a vehicle, comprising:

a seat and base apparatus, said seat thereof being adjustable within a first range toward a front of the vehicle or a rear of the vehicle;

an adjustment mechanism adapted to be affixed to a floor portion of the vehicle;

said seat and base apparatus being affixed to the adjustment mechanism, said adjustment mechanism being adjustable within a second range toward the front of the vehicle or the rear of the vehicle, said adjustment mechanism further comprising a base member, said base member defining a first plurality of bolt receiving holes, said base member having a back, a front, a first side, a second side, a top surface and a bottom surface;

a first lower rail and a second lower rail, said first lower rail being securely attached to the top surface of the base member and adjacent to the first side of the base member, said second lower rail being securely attached to the top surface of the base member, adjacent to the second side of the base member, and parallel to the first lower rail, said first lower rail and second lower rail each having a top length comprising a plurality of gears;

a first upper rail and a second upper rail, said first upper rail being slidably mounted to the first lower rail, said second upper rail being slidably mounted to the second lower rail, wherein the first upper rail and the second upper rail each have at least one rod hook;

a first latch assembly and a second latch assembly, said first latch assembly and said second latch assembly each have an outward-facing tooth, at least one in-ward facing spur, a shelf, and a rod receiving hole, wherein the tooth of the first latch assembly engages the first upper rail and the plurality of gears of the first lower rail, wherein the tooth of the second latch assembly engages the second upper rail and the plurality of gears of the second lower rail;

a handle, said handle forming a plurality of spur receiving holes, wherein said plurality of spur receiving holes being sized to be mounted on the at least one spur of the first latch assembly and the at least one spur of the second latch assembly, wherein said handle is pivotally attached to the first latch assembly and the second latch assembly;

a first rod and a second rod, said first rod is in contact with the at least one rod hook of the first upper rail and received in the rod receiving hole of the first latch assembly, said second rod is in contact with the at least one rod hook of the second upper rail and received in the rod receiving hole of the second latch assembly; and a top member, said top member defining a second plurality of bolt receiving holes, said top member having a top surface and a bottom surface, wherein the bottom surface of the top member is securely attached to the first upper rail and the second upper rail;

wherein the tooth of the first latch assembly disengages from the plurality of gears of the first lower rail and the tooth of the second latch assembly disengages from the plurality of gears of the second lower rail as the handle pivots rotationally in an upward direction.

7. The seat adjustment device of claim 6, wherein the first rod applies a force that must be overcome for the tooth of the first latch assembly to disengage from the plurality of gears of the first lower rail, wherein the second rod applies a force that must be overcome for the tooth of the second latch assembly to disengage from the plurality of gears of the second lower rail.

8. The seat adjustment device of claim 7, wherein the handle is pressed into the shelf of the first latch assembly and the second latch assembly as the handle pivots rotationally in the upward direction.

9. The seat adjustment device of claim 8, wherein the handle defines a latitudinal axis and further comprises an angled region that defines a lateral edge that intersects the latitudinal axis at an angle.

10. The seat adjustment device of claim 9, wherein the angle of the latitudinal axis relative to the lateral edge is at least twenty degrees (20°).

* * * * *